United States Patent
Kim et al.

(10) Patent No.: US 6,738,633 B2
(45) Date of Patent: May 18, 2004

(54) METHOD FOR PROVIDING NUMBER PORTABILITY OF MOBILE PHONE

(75) Inventors: Jin Yeon Kim, Daejeon (KR); Won Chul Chung, Daejeon (KR); Chung Il Kim, Daejeon (KR)

(73) Assignee: Korea Telecommunication Authority, Kyunggi-do (KR)

( * ) Notice: Subject to any disclaimer, the term of this patent is extended or adjusted under 35 U.S.C. 154(b) by 386 days.

(21) Appl. No.: 09/735,399

(22) Filed: Dec. 12, 2000

(65) Prior Publication Data

US 2002/0052211 A1 May 2, 2002

(30) Foreign Application Priority Data

Nov. 1, 2000 (JP) .......................... 2000-64659

(51) Int. Cl.[7] ............................ H04Q 7/20; H04M 1/00
(52) U.S. Cl. ...................... 455/461; 455/428; 455/551; 455/560; 379/221.14
(58) Field of Search ................................ 455/433–435, 455/428, 461, 466, 551, 552, 560, 445; 379/221.14

(56) References Cited

U.S. PATENT DOCUMENTS

| | | | | |
|---|---|---|---|---|
| 5,953,663 A | * | 9/1999 | Maupin et al. | ............. 455/433 |
| 6,049,714 A | * | 4/2000 | Patel | ......................... 455/433 |
| 6,064,887 A | * | 5/2000 | Kallioniemi et al. | ....... 455/445 |
| 6,240,293 B1 | * | 5/2001 | Koster | ......................... 455/445 |
| 6,332,022 B1 | * | 12/2001 | Martinez | ................ 379/220.01 |
| 6,374,107 B1 | * | 4/2002 | Roylan et al. | .............. 455/432 |

* cited by examiner

Primary Examiner—William Trost
Assistant Examiner—Meless Zewdu
(74) Attorney, Agent, or Firm—Merchant & Gould, P.C.

(57) ABSTRACT

The present invention is directed to a method for providing a service provider number portability of a mobile phone number in which it is possible to change a mobile phone service provider without changing a mobile directory number (MDN) in a communication environment where the phone service providers use different intelligent network protocols. In the present invention, the intelligent network calls which uses different protocols are processed using a number portability database which supports the multi-protocols in order to change the service provider between the mobile phone service providers in which the mobile phone subscribers use different intelligent protocols. Therefore, since the mobile phone number portability providing method according to the present invention is capable of processing all intelligent network calls transferred from the service providers which use different protocols, it is possible to overcome the problems such as, building additional number portability database in the case that the intelligent network protocols are different, and installing a plurality of protocols in all service switching point in the service provider network. In this way, it becomes possible to decrease the cost of the number portability, and the network operation gets easier if all service providers co-use the number portability database of the mobile phone.

5 Claims, 3 Drawing Sheets

METHOD FOR PROVIDING NUMBER PORTABILITY OF MOBILE PHONE

BACKGROUND OF THE INVENTION

1. Field of the Invention

The present invention relates to a method for providing a number portability of a mobile phone, and in particular to a method for providing a number portability of a mobile phone, in which a mobile phone subscriber is capable of freely changing a mobile phone service provider without changing a mobile directory number (MDN) using a number portability database which supports a multi-protocol.

2. Description of the Background Art

When a subscriber receives a mobile communication service from a mobile phone service provider for the first time, the mobile phone service provider designates a MSIN (Mobile Station Identification Number) and a MDN (Mobile Directory Number).

Here, the MSIN is a number used by the mobile phone service provider for inherently identifying a subscriber/terminal, and the MDN is a mobile directory number of a mobile phone subscriber.

If the subscriber wants to change to a new mobile phone service provider, the subscriber has to discard the MDN provided by the old mobile phone service provider and receive a new MDN from a new mobile phone service provider.

However, it is not that easy to change the MDN. In addition, the subscriber has to inform the change of MDN to the people around him, thereby causing much inconvenience.

Therefore, if the old MDN could be directly used without changing to a new MDN, it would save much trouble when the subscriber changes a mobile phone service from provider.

The method for exchanging the MDN between the mobile phone service providers consists of a number portability providing method of a mobile phone which uses an ANSI-41 protocol and a number portability providing method of a mobile phone which uses a GSM protocol.

The number portability providing method is used between the service providers which use the same core network protocol, so that it is possible to provide a number portability service to the mobile phone subscriber. However, in this case, it is impossible to provide a number portability service for the mobile phone service providers having different protocols.

The above problem may be overcome by building the number portability database by the kinds of the protocol although it is difficult to maintain the consistency of the data between the number portability databases. In addition, it is too expensive to implement the above matters.

The technique for providing the service provider number portability of a local phone is mainly divided into a technique implemented based on a switch and a technique implemented based on an intelligent network. The switch-based method is classified again into an onward routing method and drop-back method. Also, the intelligent network method is classified into a query on release method for inquiring to the database concerning the moved call and an all call query method for inquiring to the database concerning all calls made.

When adapting the provider number portability service to a local phone service, the most appropriate method for the local country communication environment is selected as a local country standard method.

Meanwhile, when the number portability service is provided between the local phone service providers, it affects other network service providers. In other words, in case a dialing network is a mobile phone network, not a local phone network. Therefore, the dialing network service provider may process the number portability in accordance with the all call query method. Here, in order to provide a service provider number portability of the local phone number, the mobile phone service provider must build a number portability database.

As another example, in the case that the number portability is provided based on the intelligent network method, since different intelligent network protocols (INAP, CAP/WIN) are used between the local phone network and the mobile phone network, the number portability database built in the local phone network is not used in the mobile phone network. In order to provide a service provider number portability of a local phone, the number portability database must be built for the local phone service provider, and the mobile phone service provider must additionally build the number portability database as well.

SUMMARY OF THE INVENTION

Accordingly, it is an object of the present invention to provide a method for providing a number portability of a mobile phone which is capable of providing a number portability service between mobile phone service provider networks having different protocols using a number portability database which supports a multi-protocol.

To achieve the above object, there is provided a method for providing a number portability of a mobile phone which includes a first step for transferring an enquiry message to a number portability database which supports a multi-protocol using an intelligent network protocol in a dialing network when a mobile phone of a called subscriber connected is identified as a number portability service destination at a gateway switch of a dialing network, a second step in which the number portability database recognizes the kind of an intelligent protocol of an enquiry message and calls a number portability service logic which supports a corresponding protocol, a third step for searching a number portability routing table based on the called number portability service logic, obtaining a routing information of the mobile phone of the called subscriber, processing a response message including the routing information based on the same protocol as the protocol of the dialing network and transferring to a gateway switch of the dialing network analyzes a routing number from the routing information forms an ISUP message for analyzing a routing number from the routing information and setting a call, and transfers a corresponding ISUP message to the gateway switch of the mobile phone network of the other mobile phone service provider so that the call may be transferred to the transfers a call to the mobile phone of the called subscriber subscribed to the mobile phone network of the other mobile phone service provider.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The embodiments of the present invention will be explained with reference to the accompanying drawings.

Figure 1:
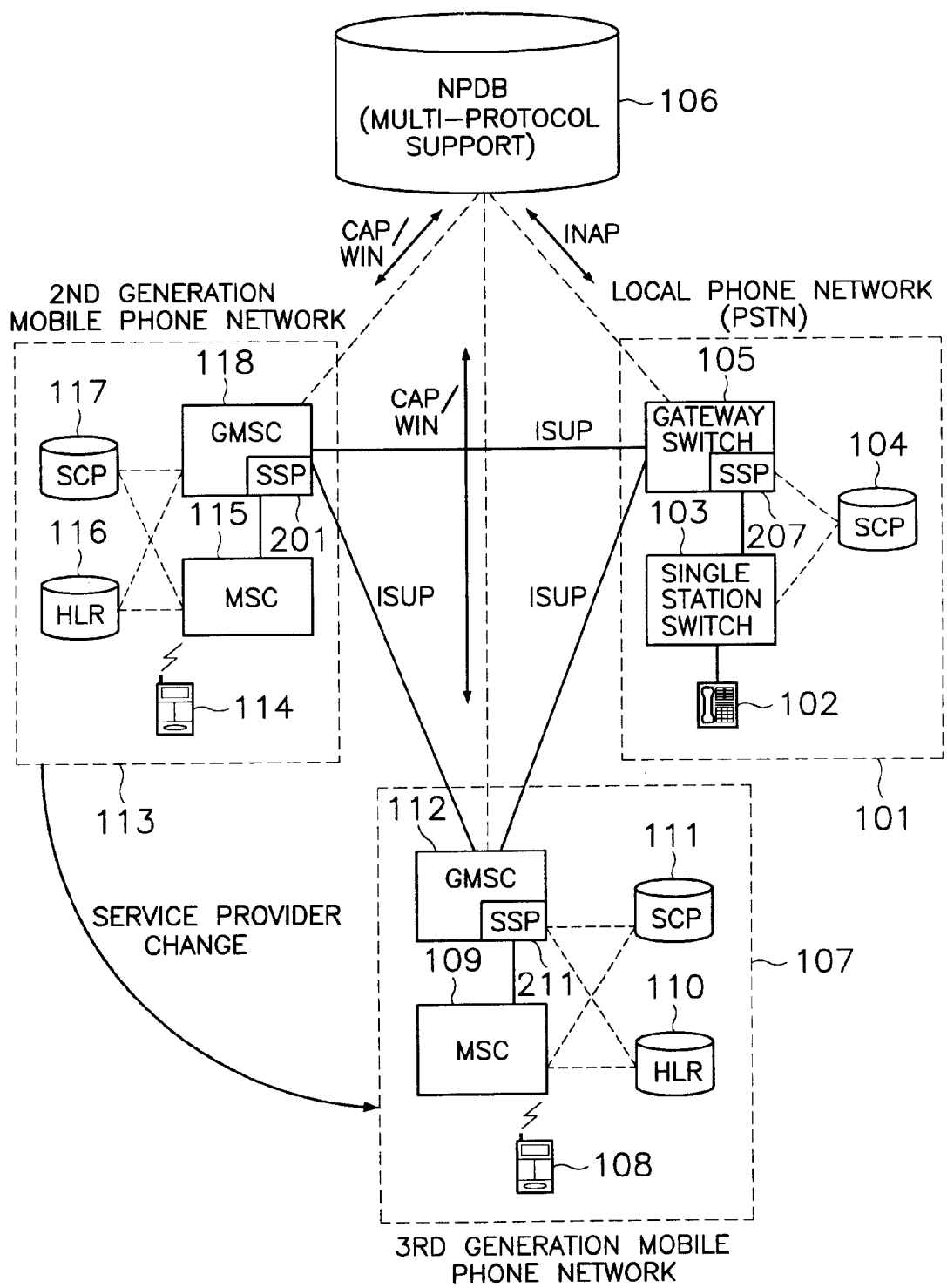
FIG. 1 is a view illustrating the construction of a communication network and a number portability of a mobile phone according to the present invention.

FIG. 1 is a view illustrating the construction of a communication network and a mobile phone number portability. In the drawings, reference numeral 101 represents a local phone network (PSTN), 102 represents a local phone subscriber, 103 represents a PSTN single station switch, 104 represents a PSTN service controller, 105 represents a PSTN gateway switch, 106 represents a NPDB (Number Portability Database) which supports a multi-protocol, 107 represents a $3^{rd}$ generation mobile phone network (IMT-2000), 108 represents a $3^{rd}$ mobile phone subscriber (IMT-2000 subscriber), 109 represents a $3^{rd}$ generation MSC, 110 represents a $3^{rd}$ generation HLR, 111 represents a $3^{rd}$ generation SCP, 112 represents a $3^{rd}$ generation GMSC, 113 represents a $2^{nd}$ generation phone network (2G PLMN), 114 represents a $2^{nd}$ generation mobile phone subscriber, 115 represents a $2^{nd}$ generation MSC, 116 represents a $2^{nd}$ generation HLR, 117 represents a $2^{nd}$ generation SCP, 118 represents a $2^{nd}$ generation GMSC, 201 represents a $2^{nd}$ generation SCP, 207 represents a PSTN SCP, and 211 represents a $3^{rd}$ SCP.

The SSP 201, 207, 211 implement a communication through the NPDB 106 a STP (Signaling Transfer Point) (not shown), and the SCP 117, 104, 111 implement a communication through the STP.

In FIG. 1, a signal line indicated by the dotted line represents a signal line through the STP.

The SSP 201, 207 and 211 shown in FIG. 1 triggers an intelligent network service or a number portability service by recognizing a DP (Detection Point) from a called number inputted by a subscriber when a call is made from each communication network.

In addition, the signal relay switch (STP) processes a message for a call process transferred from the SSP 201, 207 and 211 based on a GTT (Global Title Translation) and transfers the message to the SCP 117, 104 and 111 or to the NPDB 106.

The NPDB 106 includes a number portability service logic which supports a multi-protocol and a number portability routing table with respect to each service logic. When a certain query message is inputted through the signal relay switch (STP), the protocol adapted to the query message is analyzed, and the number portability service logic corresponding to the protocol is called. The number portability service logic obtains a routing information with respect to the called subscriber using the called number as a keyword.

Next, the NPDB 106 transfers a corresponding routing information to the SSP 201, 207 and 211 which transferred the query message using the same protocol as the query message.

The method for providing a number portability of a mobile phone according to the present invention will be explained.

When mobile phone subscribers 114 and 108 want to change a service provider, the mobile phone subscribers 114 and 108 request a number portable service to a new mobile phone service provider 107.

At this time, the mobile phone subscribers 114 and 108 maintain an old mobile directory number (MDN) and receive a new mobile terminal identification number (MSIN) from the new mobile phone service provider 107. The information with respect to the mobile phone subscribers 114 and 108 who changed the service provider is stored into the NPDB 106.

In this state, when a local phone subscriber 102 (hereinafter called a dialing subscriber) dials to call the called mobile subscriber 108 who changed a service provider, the call is transferred to the gateway switch 105 through the single station switch 103 of the dialing network 101. The SSP 207 of the gateway switch 105 of the dialing network 101 determines whether a number portability service is supposed to be provided to the called mobile subscriber number based on the service provider identification number of the called mobile subscriber number inputted from the dialing subscriber 102.

In case that the called mobile subscriber number is supposed to be provided the number portability service, the SSP 207 of the gateway switch 105 transmits a query message having the called mobile subscriber number as a keyword to the NPDB 106 in order to obtain a routing number with respect to the called subscriber.

In the present invention, the SSP 207 of the gateway switch 105 transmits a query message to the NPDB 106. According to the circumference, the service provider may selectively inquiry from the number portability database in the dialing MSC.

In particular, the gateway switch which is connected with other service provider inquires the NPDB 106 for the reason that a local characteristic of each service provider network is maintained in maximum.

The NPDB 106 analyzes the kind of an intelligent network protocol of the inquiry message received and calls a number portability service logic which supports a corresponding protocol. Then the NPDB 106 searches a number portability routing table using the number of the called mobile subscriber based on the number portability mobile service logic and obtains a routing information with respect to the called mobile subscriber.

The NPDB 106 which obtained the routing information with respect to the called mobile subscriber based on the number portability service logic transfers a response message including the routing information to the gateway switch 105 of the dialing network 101 using the same protocol as the kinds of the protocol of the received query message.

The SSP 207 of the gateway switch 105 of the dialing network 101 which received the response message analyzes a routing number from the received routing information and forms an ISUP message and transfers it to the GMSC 112 of the new mobile phone service provider 107.

Here, the routing number is a service provider identification address which represents a new mobile phone service provider.

The GMSC 112 which received the ISUP message requests a routing information to the HLR 110 for receiving a current location information of an called mobile phone subscriber. The HLR 110 transfers a routing number capable of transferring the call to the MSC switch 109 in which the subscriber receives a service at present to the GSMC 112.

The GSMC 112 transfers the call to the MSC 109 in which the called mobile phone subscriber receives the present service in accordance with the routing number. Therefore, the call is connected with the mobile called subscriber 108 based on the MSC 109.

The called mobile subscriber number corresponds to the MDN obtained from the previous mobile phone service provider.

In the present invention, when a routing number is obtained which represents an identification address of a new mobile phone service provider from the NPDB 106, the routing number is analyzed, and a call is transferred to the corresponding new mobile phone service provider, and the call is connected with the called mobile phone subscriber in such mobile phone network.

Figure 2:
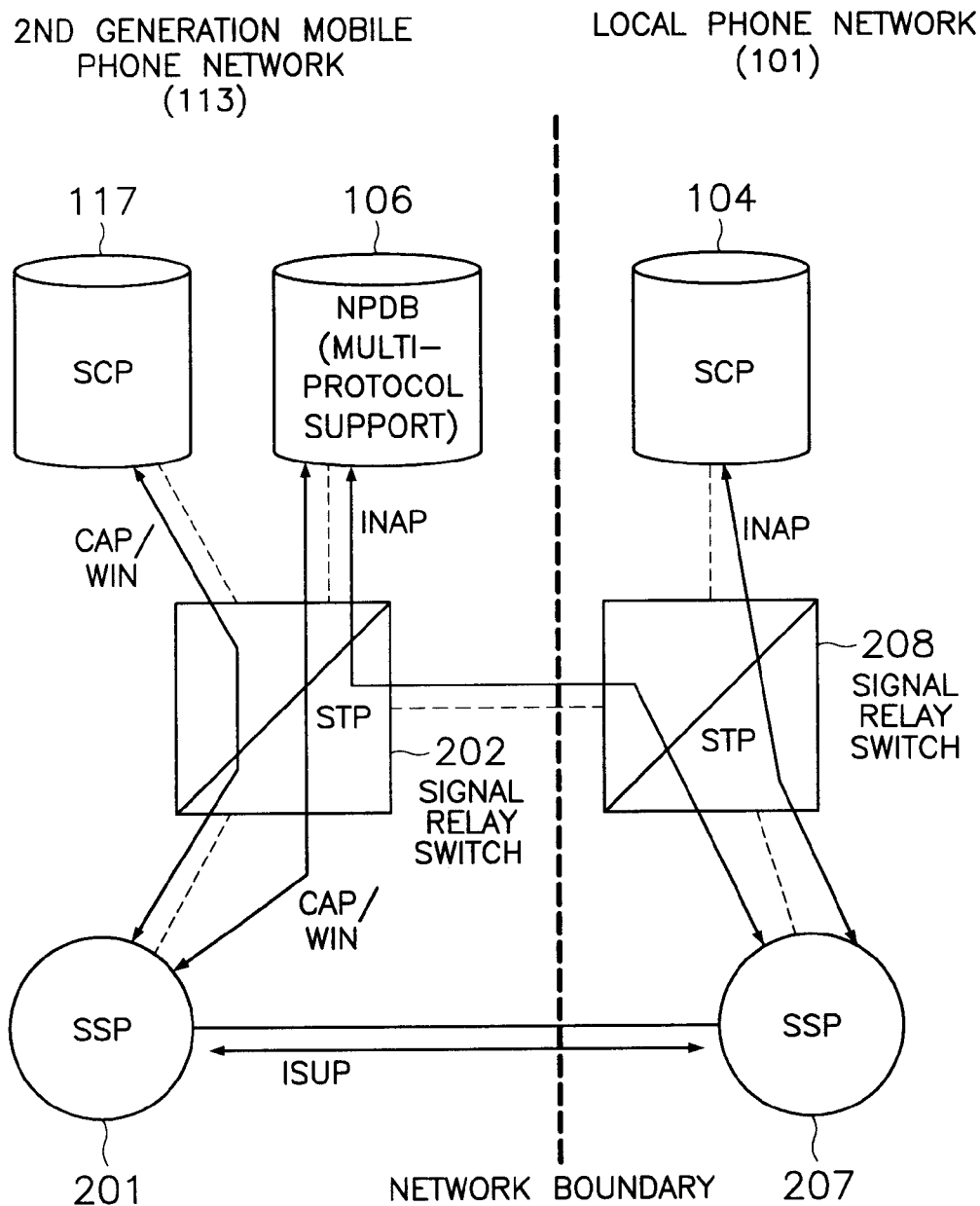
FIG. 2 is a view illustrating the construction of a number portability providing apparatus of a mobile phone according to the present invention.
Figure 3:
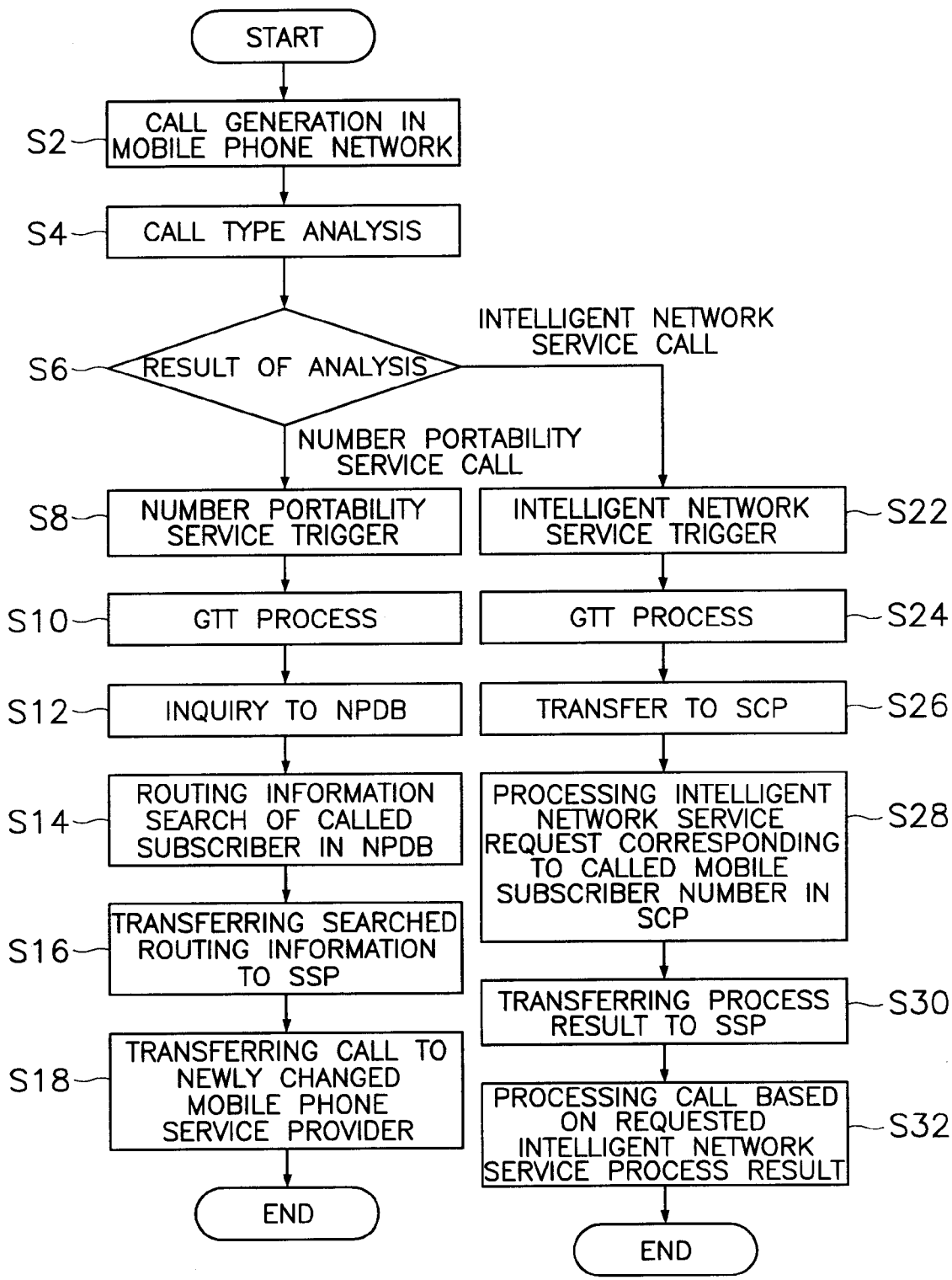
FIG. 3 is a flow chart of a method for providing a number portability of a mobile phone according to the present invention.

FIG. 2 is a view illustrating the construction of a number portability providing apparatus of a mobile phone according to the present invention, and FIG. 3 is a flow chart of a method for providing a number portability of a mobile phone according to the present invention.

The same elements of FIG. 2 as the elements of FIG. 1 are given the same numeral references. In addition, the description thereof will be omitted.

When a call is generated from the dialing subscriber 114 who subscribed the $2^{nd}$ generation mobile phone network 113 (S2), the SSP 201 recognizes a detection point from the called mobile subscriber number inputted from the dialing subscriber 114 and analyzes the kind of a call (for example, a number portability call/intelligent network service/ common call).

As a result of the analysis, when the call is determined to be a number portability call, the SSP 201 triggers the number portability service (S8). At this time, the query message having a message for the number portability call process, namely the called mobile subscriber number is transferred to the STP 202, and is GTT-processed and then transferred to the NPDB 106. At this time, the CAP or WIN protocol is used (S10, S12).

The NPDB 106 analyzes the protocol of the query message and calls a number portability service logic corresponding to the protocol. Then the NPDB 106 searches the number portability routing table using the called mobile subscriber number as a keyword based on the number portability service logic and obtains a routing information with respect to the called subscriber (S14).

The NPDB 106 processes the response message including the routing information based on the same protocol as the query message and transfers the response message to the SSP 201 through the STP 202 (S16).

The SSP 201 analyzes the routing number based on the routing information included in the response message and transfers the call to the mobile phone network of a newly changed mobile phone service provider using a mobile phone number corresponding to the routing number, namely, the number portability service of the called subscriber, so that the call connection is processed based on the switch of the mobile phone network.

As a result of the analysis of the step S4, if the call is considered to be the intelligent network service call, the SSP 201 triggers the intelligent network service (S22). At this time, the message for the intelligent network call process is transferred to the STP 202 and is GTT-processed and is transferred to the SCP 117. At this time, the CAP or WIN protocol is used (S24, S26).

An intelligent network service request corresponding to the called mobile subscriber number is processed based on the message transferred by the SCP 117 (S28). When a response message including a result of the process is transferred to the SSP 201 through the STP 202, the SSP 201 processes an intelligent network call based on a result of the intelligent network service process included in the response message (S32).

When a service provider number portability call of the mobile phone is made in the local phone network, the SSP 207 of the local phone recognizes the detection point DP through the steps S8 through S18 and triggers the number portability service and requests a routing information to the NPDB 106 with respect to the called subscriber through the STP 208 and the STP 202 of the mobile phone network 113.

At this time, the SSP 207 transmits an enquiry message which transmits the called mobile subscriber number to the NPDB 106, and the NPDB 106 searches the routing information with respect to the called mobile subscriber, transmits the response message including a corresponding routing information to the SSP 207, obtains a routing number of the called subscriber based on the routing information contained in the response message, forms an ISUP message for setting a call to the switch of the mobile communication network corresponding to the routing number and transfer a call.

In addition, when an intelligent network service call is made in the local phone network 101, the detection point DP is recognized by the SSP 207 of the local phone network through the steps S22 through S32, and the intelligent network service is triggered. When a message for the intelligent network call process is transferred to the STP 208, the STP 208 processes the GTT and transfers to the SCP 104.

An intelligent network service request corresponding to the called subscriber number is processed based on the message transferred by the SCP 104 (S28), and the response message including a result of the process is transferred to the SSP 207 through the STP 202. The SSP 207 processes an intelligent network call based on a result of the intelligent network service process included in the response message (S32).

At this time, the INAP protocol is used as an intelligent network protocol.

When a mobile phone user wants to change the mobile phone service provider, it is possible to change the old mobile phone service provider using the MDN provided by the old mobile phone service provider without receiving a new MDN from a new mobile phone service provider.

The present invention is directed to a method for providing a service provider number portability of a mobile phone number in which it is possible to change a mobile phone service provider without changing a mobile directory number (MDN) in a communication environment in which the phone service providers use different intelligent network protocols. In the present invention, the intelligent network calls transferred from the mobile phone service provider network which uses different protocols are processed using a number portability database which supports the multi-protocols in order to change the service provider without changing the mobile directory number between the mobile phone service providers in which the mobile phone subscribers use different intelligent protocols. In the present invention, it is possible to decrease the cost for building different number portability database in the case that the intelligent network protocols are different. In addition, since the protocols used inside of the service providers are supported by the number portability database, it is possible to minimize any side effects of the conventional service provider network.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A umber portability providing method of a mobile phone, comprising:
   a first step for transferring an enquiry message to a number portability database which supports a multi-protocol using an intelligent network protocol used in a dialing network when a mobile phone of a called subscriber connected with a gateway switch of a dialing network is a number portability service destination;
   a second step for recognizing the kind of an intelligent protocol of an enquiry message and calling a number portability service logic which supports a corresponding protocol in the number portability database,
   a third step for searching a number portability routing table based on the called number portability service, obtaining a routing information of a mobile phone of the called subscriber, processing a response message including the routing information based on the same protocol as the protocol of the dialing network and transferring to a gateway switch of the dialing network; and
   a fourth step in which the gateway switch of the dialing network analyzes a routing number from the routing information and at the same time forms an ISUP message for setting a call, and transfers a corresponding ISUP message to the gateway switch of the mobile phone network of the other mobile phone service provider so that the call may be transferred to the mobile phone of the called subscriber subscribed to the mobile phone network of the other mobile phone service provider.

2. The method of claim 1, wherein said routing number is a business identification address which represents the other mobile phone service provider.

3. The method of claim 1, wherein said number portability service logic is directed to searching the number portability routing table based on the called subscriber mobile phone number.

4. The method of claim 2, wherein said first step, the called mobile phone is determined as a destination of the number portability service when the service provider identification number included in the called subscriber mobile phone number is registered to provide the number portability service.

5. The method of claim 1, wherein said number portability routing table is built with respect to all supportable intelligent network protocols.

* * * * *